US012631486B2

(12) United States Patent
Newton et al.

(10) Patent No.: US 12,631,486 B2
(45) Date of Patent: May 19, 2026

(54) LASER ALIGNMENT SENSOR

(71) Applicants: David W. Newton, Fredericksburg, VA (US); Jeremiah E. Lange, King George, VA (US)

(72) Inventors: David W. Newton, Fredericksburg, VA (US); Jeremiah E. Lange, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 177 days.

(21) Appl. No.: 18/434,906

(22) Filed: Feb. 7, 2024

(65) Prior Publication Data

US 2025/0251277 A1     Aug. 7, 2025

(51) Int. Cl.
   *G01J 1/42*          (2006.01)
   *G01B 11/27*       (2006.01)

(52) U.S. Cl.
   CPC .......... *G01J 1/4228* (2013.01); *G01B 11/272* (2013.01); *G01J 2001/4247* (2013.01)

(58) Field of Classification Search
   CPC ........... G01J 1/4228; G01J 2001/4247; G01B 11/272
   See application file for complete search history.

(56) References Cited

U.S. PATENT DOCUMENTS 6,274,873 B1 *   8/2001   Outwater .............. G01J 3/4406
                                                             250/271
6,424,412 B1 *   7/2002   Matthews .......... G02B 27/0101
                                                             348/E9.026
6,507,685 B1 *   1/2003   Polynkin .............. G02B 6/4227
                                                             398/43

* cited by examiner

*Primary Examiner* — Jennifer D Bennett
(74) *Attorney, Agent, or Firm* — Gerhard W. Thielman

(57)     ABSTRACT

An alignment sensor is provided for a laser system that emits a coherent beam. The sensor includes a dispersing prism, a focal plane array detector, a processor, and a transform lens. The dispersing prism receives the beam for deflection and wavelength separation as transmission into a plurality of dispersion beams. The transform lens focuses the plurality of dispersion beams towards the focal plane array to yield data. The focal plane array detector transmits the data. The processor receives the data.

5 Claims, 3 Drawing Sheets

| 210 | 220 Mirrors affecting alignment | | 230 Mirrors to Actively Align | |
|---|---|---|---|---|
| 120 Source 1 | N/A | | D2 | 145 |
| 125 Source 2 | D2 | 145 | M1 | 150 |
| 130 Source 3 | N/A | | M3 | 165 |
| 135 Source 4 | M3 | 165 | M2 | 160 |

Table 1: Laser Alignment Sensor Interactions Based on Layout

FIG. 7        RELATED ART

LASER ALIGNMENT SENSOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to laser alignment. In particular, a laser beam having a distribution of wavelengths across a range can be separated to provide improved accuracy in alignment angles.

The invention came about to fulfill a need for a laser source that requires spatial and angular alignment of multiple laser sources, each having different wavelengths. This beam combination provides increased laser output power and broader wavelength diversity. To meet the need, the angular error of each laser wavelength, referenced one wavelength as a master reference, must be monitored persistently for feedback loop correction.

SUMMARY

Conventional laser alignment sensors yield disadvantages addressed by various exemplary embodiments of the present invention. In particular, various exemplary embodiments provide an alignment sensor for a laser system that emits a coherent beam. The sensor includes a dispersing prism, a focal plane array detector, a processor, and a transform lens. The dispersing prism receives the beam for deflection and wavelength separation as transmission into a plurality of dispersion beams. The transform lens focuses the plurality of dispersion beams towards the focal plane array to yield data. The focal plane array detector transmits the data. The processor receives the data.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 7 is a schematic view of a second conventional arrangement.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in nanometers (nm), mass in grams (g), time in seconds(s), angles in degrees (°) or radians, force in newtons (N), temperature in degrees Celcius (° C.) or kelvins (K), energy in joules (J), and frequencies in hertz (Hz. Supplemental measures can be derived from these, such as density in grams-per-cubic-centimeters $(g/cm^3)$, moment of inertia in kilogram-square-meters $(kgm^2)$ and the like.

Exemplary embodiments provide an advanced laser alignment sensor, used for angular alignment control of multiple laser sources, each having different wavelengths. The purpose of these embodiments is to persistently sense angular misalignment of multiple independent laser sources, each having different wavelengths, to microRadian class precision. The measured misalignment angles are used as feedback in a control system to dynamically correct alignment of each laser.

With each individual laser persistently co-aligned, a laser weapon system can then point an effectively single, aggregate laser beam towards a down-range target. This maximizes the power on target for the full laser weapon. Exemplary embodiments enable applications for current and future multi-wavelength laser systems, for the U.S. Navy and other services that require beam combination and co-alignment.

Figures 1, 2:
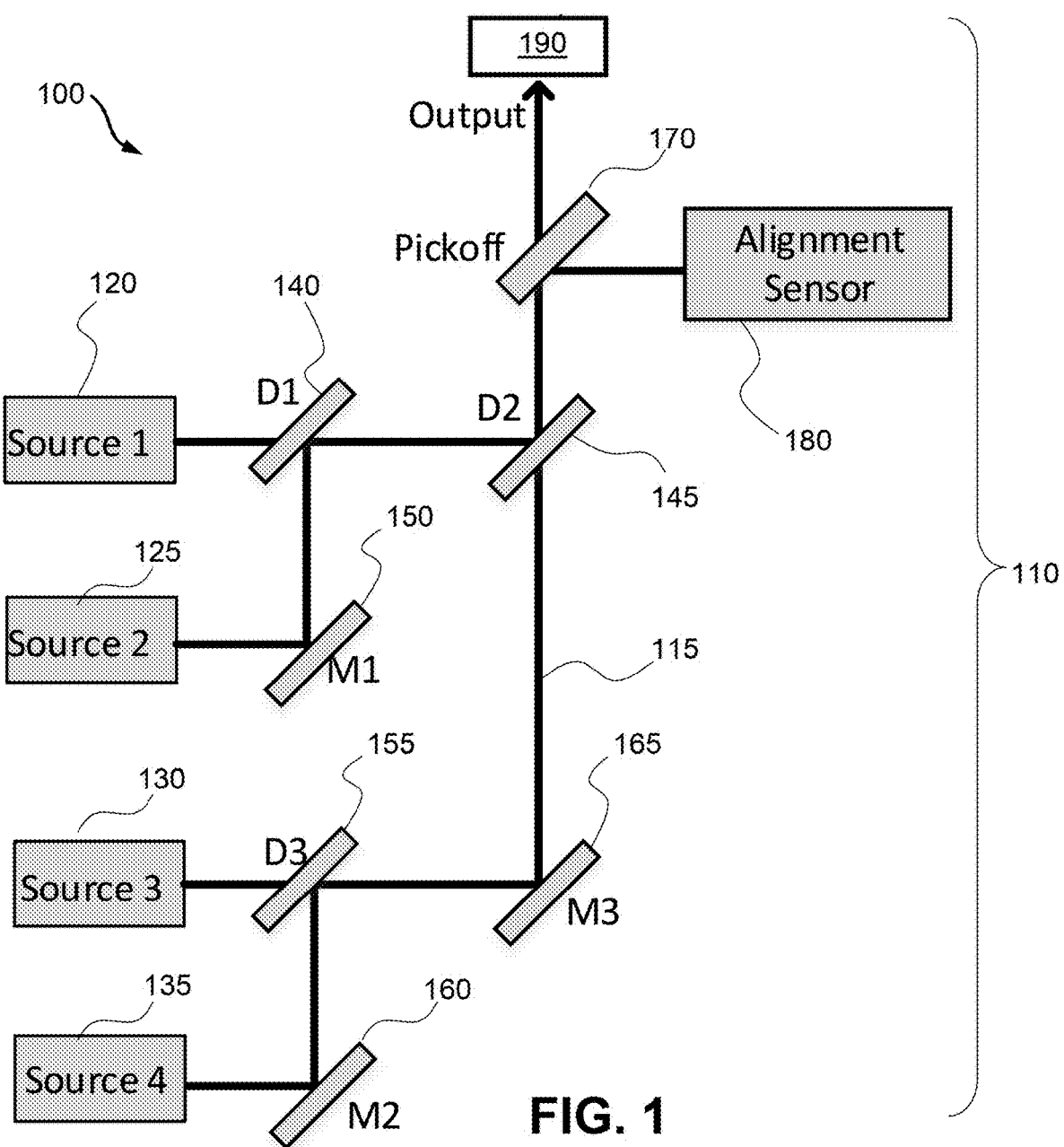
FIG. 1 is a schematic view of an alignment sensor system.
FIG. 2 is a tabular view of sources and mirror interactions.

FIG. 1 shows a functional schematic diagram view 100 of a four-laser alignment loop configuration 110. This architecture is scalable to a larger or smaller number of laser sources to emit coherent light beams 115 produced by four laser sources labeled first as 120, second as 125, third as 130 and fourth as 135. The beam 115 from the first source 120 successively reaches dichroic mirrors D1 as 140 and D2 as 145. The beam 115 from the second source 125 reaches steering mirror M1 as 150. The beam 115 from the third source 130 reaches dichroic mirror D3 as 155. The beam 115 from the fourth source 135 reaches steering mirror M2 as 160.

Beams 115 from sources 130 and 135 passing through D3 as 155 and reflecting by M2 as 160 are reflected by steering mirror M3 as 165, which then pass through D2 as 145. Beams 115 from sources 120 and 125 that pass through D1 as 140 and reflect from M1 as 150 combine with those from sources 130 and 135 passing through D2 as 145 to a pickoff mirror 170 that reflect to an alignment sensor 180 and pass through to an output 190. Dichroic mirrors D1 as 140, D2 as 145, D3 as 155 and pickoff 170 act as beam splitters. Steering mirrors M1 as 150, M2 as 160 and M3 as 165, along with dichroic mirror D2 as 145, are motorized to provide slight spatial motion to correct for angular errors.

The exemplary alignment sensor 180 detects the angular alignment error of each source continuously and sends feedback signals to each motorized mirror. The pickoff 170 is a partially reflective window directing the combined beams 115 into the alignment sensor 180.

The specific design instance in this description provides alignment correction to less than one microRadian error. Some applications may require greater or lesser alignment accuracy and the sensor package can be scaled accordingly based on key design factors that are described in herein. The alignment sensor 180 comprises three main components:

(1) the prism assembly, (2) the transform lens, (3) the focal plane array detector, and (4) the detector processor.

In the exemplary embodiment, the laser alignment sensor 180 is used in conjunction with beam combination optics and motorized mirrors as shown in Table 1 as FIG. 2 for laser alignment sensor interactions based on layout. This tabular view 200 includes a source column 210, an alignment influencing column 220 and an alignment affecting column 230. The rows designate the four sources 120, 125, 130 and 135.

For the first source 120, the aligned column 230 identifies D2 as 145. For the first source 120, the aligned column 230 identifies D2 as 145. For the second source 125, the influencing column 220 identifies D2 as 145, and the aligned column 230 identifies M1 as 150. For the third source 130, the aligned column 230 identifies M3 as 165. For the fourth source 135, the influencing column 220 identifies M3 165, and the aligned column 230 identifies M2 as 160.

Figures 3, 6:
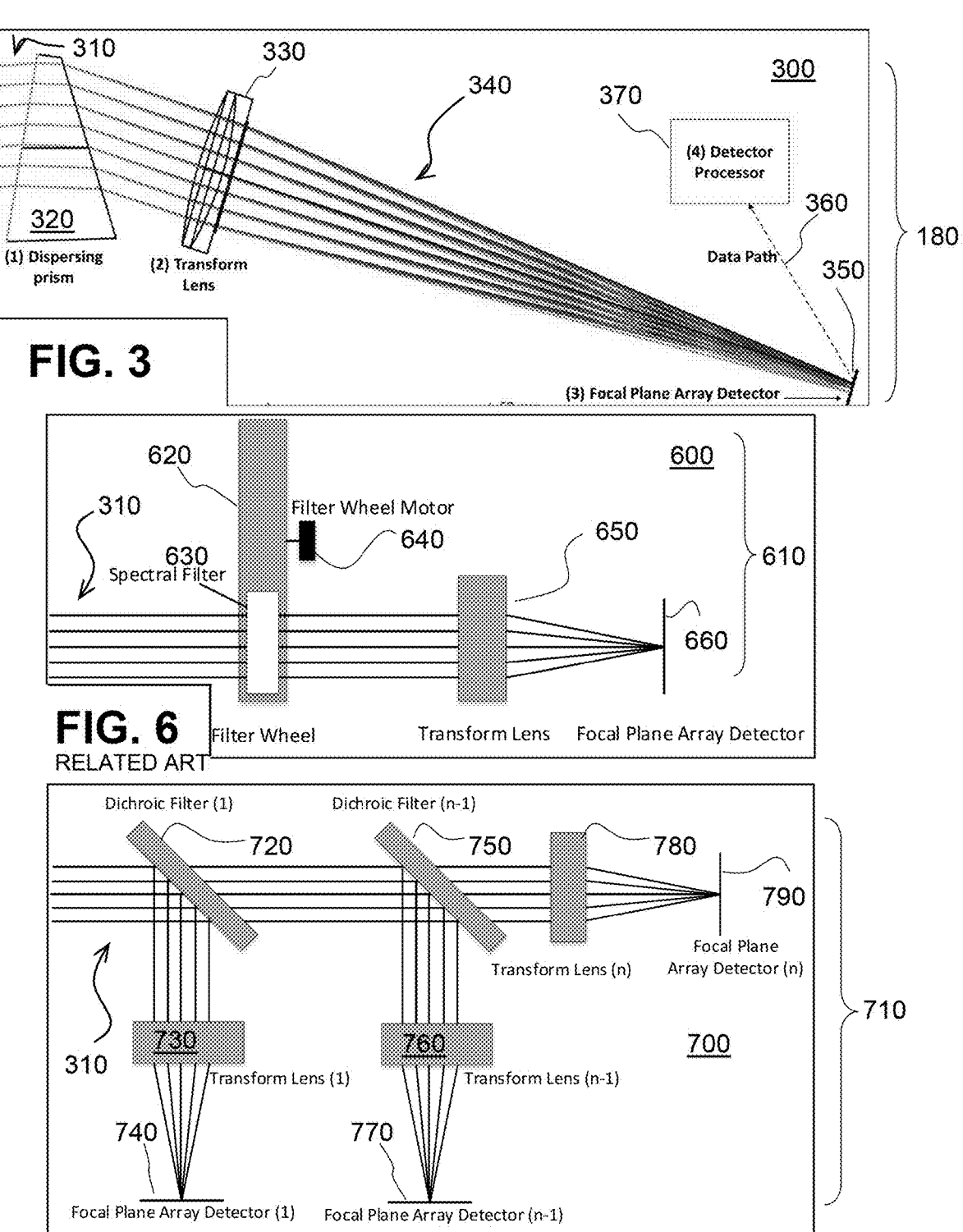
FIG. 3 is a schematic view of a focal lenses for detection.
FIG. 6 is a schematic view of a first conventional arrangement.

FIG. 3 shows a diagram view 300 of a prism assembly as the alignment sensor 180 to disperse a multi-wavelength laser beam bundle 310. The prism assembly 180 includes a dispersing prism 320 and a transform lens 330 to focus the beam 310 into a converging beam 340 that concentrates at a focal plane array detector 350. A data path 360 from the detector 350 reaches a detector processor 370. The function of the prism 320 is to provide dispersion, or wavelength-dependent angular separation to the beam 310.

The transform lens 330 converts the dispersed angles to spatial positions on the focal plane array 350, such that spatial displacements on the focal plane array become linearly proportional to changes in the input angle of each beam 310 into the prism assembly 180. The array detector 350 is positioned to enable sensing of the beam position, feeding images to a processor 370 for computing those positions. The detector processor 370 calculates positions of each beam location, and errors in the nominal positions, and sends feedback to motorized mirrors 150, 165 to correct the angular errors.

Figures 4, 5:
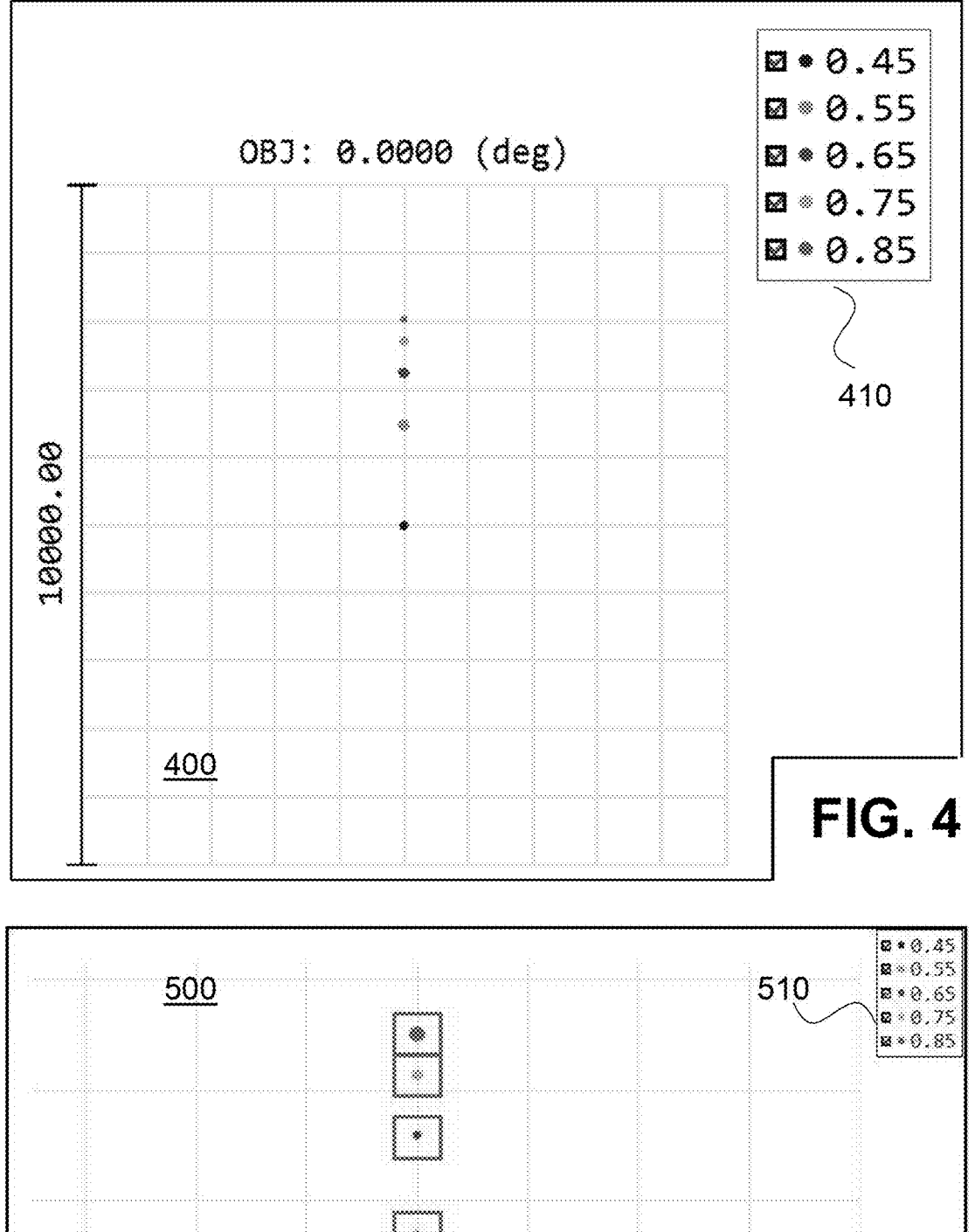
FIG. 4 is a graphical view of wavelength diffraction.
FIG. 5 is a detail graphical view of the diffraction.

FIG. 4 shows a simulated multi-beam image graphical view 400 with the wavelengths identified in a legend 410 distinguished in nanometers (nm). Five laser beams 310 spanning wavelengths from 450 nm to 850 nm in 100 nm increments, are distributed across the simulated focal plane detector 350. In this case, each wavelength is perfectly aligned (spatially and angularly). Without dispersion, each beam would have the same spatial position on the detector 350, and the beams 310 would be indistinguishable from each other. Because individual beams 310 can now be distinguished from each other using this approach, each beam position can be monitored independently and persistently using the detector processor 370.

FIG. 5 shows a detail 500 of the graphical view 400 with the wavelengths identified in a legend 510. This provides further elucidation of how individual beam positions are monitored. Detector regions of interest (ROI) are used to separate the position of each beam. The spatial separation of each beam position, set by the dispersion of the prism 320, is set to be sufficiently large to keep time-dependent beam positions errors within their respective ROI. A standard-weighted centroid is calculated for each position for this application, though other computational methods for calculated spot positon could be implemented as an alternative.

The nominal beam positions for alignment can be determined in several ways. In these exemplary embodiments, a separate alignment sensor is used to verify that each beam is co-aligned in angle, prior to inserting the dispersing prism 320. The relative spacing of each beam 310 is then calculated and recorded with the prism 320 in this initially aligned state. These calibration data are used in the alignment loop to control the relative spacing of each beam 310. There are other methods for establishing the initial, relative beam spacing, and others may be very suitable based on the application. Two conventional techniques can be described for comparison.

FIG. 6 shows a diagram view 600 of a first conventional optical test configuration 610. A beam 310 enters a filter wheel 620 containing a spectral filter 630 spun by a wheel motor 640 to adjust periodically transition filter influence on the beam 310. The spectral filter 630 may constitute one of several within the filter wheel 620 with a select variety of transmit wavelengths. The beam 310 passes through a transform lens 650, which concentrates the beam to focus on a focal plane array detector 660.

FIG. 7 shows a diagram view 700 a second conventional optical test configuration 710 with array of dimension n. A beam 310 enters a first dichroic filter 720, which splits the beam 310 including reflection towards a first transform 730 that concentrates the beam 310 to a first focal plane array detector 740. An $n-2^{th}$ set of repeat filters, lenses and detectors follow without illustration.

The filter 720 also transmits the beam 310 to an $n-1^{th}$ dichroic filter 750, which splits the beam 310 including reflection towards an $n-1^{th}$ transform lens 760 that concentrates the beam 310 to an $n-1^{th}$ focal plane array detector 770. The filter 750 also transmits the beam 310 to an $n^{th}$ transform lens 780 that concentrates the beam 310 to an $n^{th}$ focal plane array detector 790.

Depending on the required correction accuracy and sensor environmental requirements, other design features may be required. For this application, an additional temperature controlled oven is required to maintain the temperature of the prism 320 within approximately ±5° C. to control changes in the prism refractive index, dispersion, and mechanical dimensions to maintain the accuracy of the calibration over a wide ambient operating temperatures.

There are several advantages to using the dispersing prism 320 to enable separation of the spectral lines on the detector 350, when compared to conventional methods of performing alignment to include:

1) turn a filter wheel 620 and spectral filters 630 to provide temporal separation of wavelengths, or 2) employ a beam splitter D1 or D2 as 140, 145 to spatially separate the source wavelengths onto multiple detectors.

The key advantages to the prism-based design over the conventional approaches are:

(a) Persistent, simultaneous monitoring of all laser wavelengths: This is ideal for control systems to maximize control loop bandwidth, or rate at which alignment corrections can be made.

(b) Senses and permits corrections of angular beam misalignments, due to thermal drift of mechanical components or the laser sources themselves.

(c) No moving parts for the alignment sensor 180 (not including motors for mirror elements 145, 150, 160 and 165), which increases mean time between failure for naval and other applications.

(d) Low size, weight, and power requirements, due to a consolidated sensor architecture, as compared to alternatives.

(e) Measurement of relative beam alignment on a single detector, which improves boresight and calibration stability over a large range of ambient operating temperatures. Relative beam alignment is insensitive to translations and rotations of the alignment sensor detector, over a wide range of ambient temperatures.

(f) Utilizes detector 370 comprised of focal plane array 350 and transform lens 330, both of which can have flexible design choices to scale the system resolution based on alignment and packaging requirements. For example, longer focal length transform lenses can be used for improved sensor resolution, if adequate space is available.

(g) Supports additional alignment corrections outside of co-alignment of laser beams 310, to include corrections of dispersion due to other refractive optical components in the parent laser system, or due to dispersion of the atmosphere. The proposed architecture can simultaneously support calibrated co-alignment of the lasers, and these added open-loop dispersion corrections.

(h) Simplified integration of additional or different laser wavelengths: As compared to other approaches, the exemplary configuration enables addition or change of laser wavelengths. In many cases, no hardware alteration is required, improving flexibility of the design as naval mission requirements or laser source technologies evolve.

There are two conventional methods of performing alignment to include:

1) spin a filter wheel 620 with spectral filters 630 to provide temporal separation of wavelengths, and 2) employ a beam splitter 720, 750 to spatially separate the source wavelengths onto multiple detectors.

The layout 610 using a filter wheel 620, requires that the input beams 310, pass through a spectral filter 630 located on the filter wheel 620, through the transform lens onto detector 350. The disadvantages of using this conventional layout 610 over a dispersive prism 320 include.

a. Non-simultaneous measurement of all wavelengths. Use of the filter wheel 620 requires that the light pass through a single spectral filter 630, which only permits the passing of a single source wavelength at any given moment. Switching positions in the filter wheel 620 enables changing the monitored wavelength, which takes time to transition and time for the detector 660 to settle, providing an average time of S(s), in addition to the monitoring time at each wavelength M(s). Depending upon the number of positions n for the filter wheel, this involves a period of (n×S+(n−1)×M) (s) until each wavelength will be monitored again. The use of the prism 320 enables measuring a spatial displacement rather than a temporal displacement, thus allowing for constant monitoring of all source wavelengths.

b. Larger package. Using the filter wheel 620 requires a set of spectral filters 630, each with a sufficient diameter D to enable passing the beam 310 without any clipping. Disposing the filters 640 within the filter wheel 620 increases with each source wavelength to be monitored, taking a minimum footprint of twice the diameter (>2×D), dependent upon the number of wavelengths to be monitored. This delay is obviated by employing a prism 320 instead, regardless of the number of wavelengths to be monitored.

c. Less flexible number of wavelengths. The number of channels that can be monitored with any conventional single build depends upon the number of slots built into the filter wheel. With the exemplary prism configuration, any number of wavelengths can be monitored for alignment, with the maximum number depending the following factors: usable pixels across the detector; spot size on the detector for each channel; and pixel separation based on expected angular displacement at each wavelength. These values define an effective minimum spectral separation, which drive the maximum number of wavelengths that can be observed simultaneously.

d. Less flexible for changes to system wavelength. Use of the conventional filter wheel requires procurement of custom spectral filters that separate the input wavelengths. These would likely be designed and manufactured as a set, which limits what wavelengths can be seen, as each channel needs to be tuned to observe only a single wavelength, to the exclusion of all other wavelengths from a given source. With the exemplary prism, one can adjust the wavelengths used, within the maximum bounds of the overall antireflective (AR) coating, and subject to minimum spectral separation as in item c. above.

f. Less mechanical stability. The conventional filter wheel has potential instabilities including: tolerance on the repeatability of the lateral and angular position of filter slots. Depending on the tolerances of each given layout, these variations can correspond to a perceived variation in angular displacement of a source. The exemplary prism, once mounted in place omits moving parts that can provide variation in the angular displacement of the source.

Beam splitter—The conventional layout 710 using a beam splitter requires the input beams pass through dichroic filters 720, 750, sending each source into separate detectors 740, 770, 790. This requires use of (n−1) dichroic filters, with n detectors where n is the number of spectral lines to be monitored. The disadvantages of using this splitter configuration 710 over a dispersive prism 320 include.

a. Increased packaging requirements. Using the conventional beam splitter for each of the wavelength lines requires a set of dichroic filters 720, 750, each with a sufficient diameter D and mounting to permit passing the beam 310 without any clipping, or interfering with installing and aligning each filter. Additionally, each source requires its own, independent detector (transform lens plus focal plane array detector). As the number of wavelengths for alignment increases, this can greatly increase the required footprint of the conventional package.

b. Less flexible for scaling of number of wavelengths. The number of channels that can be monitored with any single build will be fixed dependent upon the number of dichroics built into the beam splitter. With the exemplary configuration as assembly 180, the maximum number of channels depends upon the following factors: (i) Usable pixels across the detector 350; (ii) Spot size on the detector for each channel; (iii) Pixels separation based on expected angular displacement at each wavelength. These values define an effective minimum spectral separation, which drive the maximum number of wavelengths that can be observed simultaneously.

c. Less flexible for changes to system wavelength. Use of the beam splitter requires procurement of custom dichroic filters that separate the sources into input wavelengths. These are designed and manufactured as a set, which when mounted and aligned, limit the number of wavelengths that can be observed during operation. By contrast, the exemplary dispersion prism 320 enables adjustment the number of wavelengths used within the bounds of the maximum spectral spread of the prism on the detector 350, and the minimum separation for spectral clarity.

d. Reduced power available to operate. Using a beam splitter needs the number of detectors to equal the number of sources to be aligned. For the dispersion prism 320, only a single detector 350 will be required to monitor all sources simultaneously.

e. Increased processor requirements. Having multiple focal planes increases the amount of data processing and sensor interface requirements, which can increase the processor size and power, and restrict available options to support processing.

f. Reduced boresight stability. Having multiple detectors requires them to remain mechanical co-registered to requirements determined by the application. For conventional arrangement, one microRadian mechanical stability is unlikely to be achieved and thus, using a single focal plane array detector 350 mitigates this issue.

Exemplary embodiments have the potential for use in the defense market. The federal government is considering the possibility of offering the exemplary prism assembly as an alignment sensor for incorporation into other Navy projects, which are furnished by contractors.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

8

What is claimed is:

1. An alignment sensor for a laser system that emits a coherent beam, said sensor comprising:
    a dispersing prism for receiving the beam for deflection and wavelength separation as transmission into a plurality of dispersion beams;
    a transform lens that focuses said plurality of dispersion beams towards a focal plane as a plurality of concentration beams;
    a focal plane array detector for receiving said plurality of concentration beams and sensing a relative position for each focal intercept of said plurality of concentration beams; and
    a processor for receiving said relative position, determining an alignment error of said relative position, and providing a correction signal to a mirror for engaging spatial motion that compensates for said alignment error in the coherent beam.

2. The alignment sensor according to claim 1, wherein the coherent beam originates from a plurality of laser emitters.

3. The alignment sensor according to claim 2, wherein each laser emitter of said plurality of laser emitters operates at a distinct wavelength.

4. The alignment sensor according to claim 2, wherein said plurality of laser emitters operates at a corresponding plurality of wavelengths between 450 nm to 850 nm.

5. The alignment sensor according to claim 1 wherein said processor receives each said relative position from said each focal intercept for sequentially determining said alignment error.

* * * * *